United States Patent
Tschanz et al.

(10) Patent No.: US 10,571,916 B2
(45) Date of Patent: Feb. 25, 2020

(54) CONTROL METHOD FOR AUTONOMOUS VEHICLES

(71) Applicant: UATC, LLC, San Francisco, CA (US)

(72) Inventors: Frederic Tschanz, Pittsburgh, PA (US); Diana Yanakiev, Birmingham, MI (US); Jur van den Berg, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 79 days.

(21) Appl. No.: 15/697,368

(22) Filed: Sep. 6, 2017

(65) Prior Publication Data

US 2019/0018412 A1    Jan. 17, 2019

Related U.S. Application Data

(60) Provisional application No. 62/532,494, filed on Jul. 14, 2017.

(51) Int. Cl.
 *G01C 22/00*    (2006.01)
 *G05D 1/00*    (2006.01)
 *G05D 1/02*    (2020.01)

(52) U.S. Cl.
 CPC ......... *G05D 1/0088* (2013.01); *G05D 1/0212* (2013.01)

(58) Field of Classification Search
 CPC .. G05D 1/0088; G05D 1/0217; G05D 1/0212; G05D 2201/0213; B60W 30/00

USPC ........................... 701/23, 25, 26, 36
See application file for complete search history.

(56) References Cited

U.S. PATENT DOCUMENTS

| | | | | |
|---|---|---|---|---|
| 2008/0269985 | A1* | 10/2008 | Yamada | G08G 1/0104 701/36 |
| 2012/0083960 | A1* | 4/2012 | Zhu | G05D 1/0214 701/23 |
| 2016/0048132 | A1* | 2/2016 | Cherepinsky | G05D 1/0808 701/4 |
| 2017/0168485 | A1* | 6/2017 | Berntorp | B60W 30/00 |
| 2017/0213458 | A1* | 7/2017 | Gordon | G08G 1/097 |
| 2017/0221366 | A1* | 8/2017 | An | G08G 1/07 |
| 2018/0089563 | A1* | 3/2018 | Redding | G06N 3/08 |
| 2018/0173224 | A1* | 6/2018 | Kim | G05D 1/0061 |
| 2018/0188727 | A1* | 7/2018 | Zhuang | B60W 50/035 |
| 2018/0373245 | A1* | 12/2018 | Nishi | G05D 1/0088 |

* cited by examiner

*Primary Examiner* — Shardul D Patel
(74) *Attorney, Agent, or Firm* — Dority & Manning, P.A.

(57) ABSTRACT

The present disclosure provides control systems and methods for an autonomous vehicle. In one example implementation, a control method includes obtaining data indicative of a motion plan for the autonomous vehicle. The method includes upsampling the data indicative of the motion plan to determine a desired vehicle state for the autonomous vehicle. The method includes obtaining data indicative of a current vehicle state for the autonomous vehicle. The method includes determining a control command for the autonomous vehicle based at least in part on the desired vehicle state and the current vehicle state. The method includes controlling the vehicle component based at least in part on the control command.

19 Claims, 6 Drawing Sheets

CONTROL METHOD FOR AUTONOMOUS VEHICLES

PRIORITY CLAIM

The present application is based on and claims priority to U.S. Provisional Application 62/532,494, having a filing date of Jul. 14, 2017, which is incorporated by reference herein.

FIELD

The present disclosure relates generally to autonomous vehicles.

BACKGROUND

An autonomous vehicle is a vehicle that is capable of sensing its environment and navigating with little or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion plan through such surrounding environment. A control system can control one or more vehicle components (e.g., steering components) such that the autonomous vehicle moves according to the motion plan.

SUMMARY

Aspects and advantages of embodiments of the present disclosure will be set forth in part in the following description, or can be learned from the description, or can be learned through practice of the embodiments.

One example aspect of the present disclosure is directed to a control method for an autonomous vehicle. The control method includes obtaining, by a computing system comprising one or more computing devices, data indicative of a motion plan for the autonomous vehicle. The method includes upsampling, by the computing system, the data indicative of the motion plan to determine a desired vehicle state for the autonomous vehicle. The method includes obtaining, by the computing system, data indicative of a current vehicle state for the autonomous vehicle. The method includes determining, by the computing system, a control command for the autonomous vehicle based at least in part on the desired vehicle state and the current vehicle state. The method includes controlling, by the computing system, the vehicle component based at least in part on the control command.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
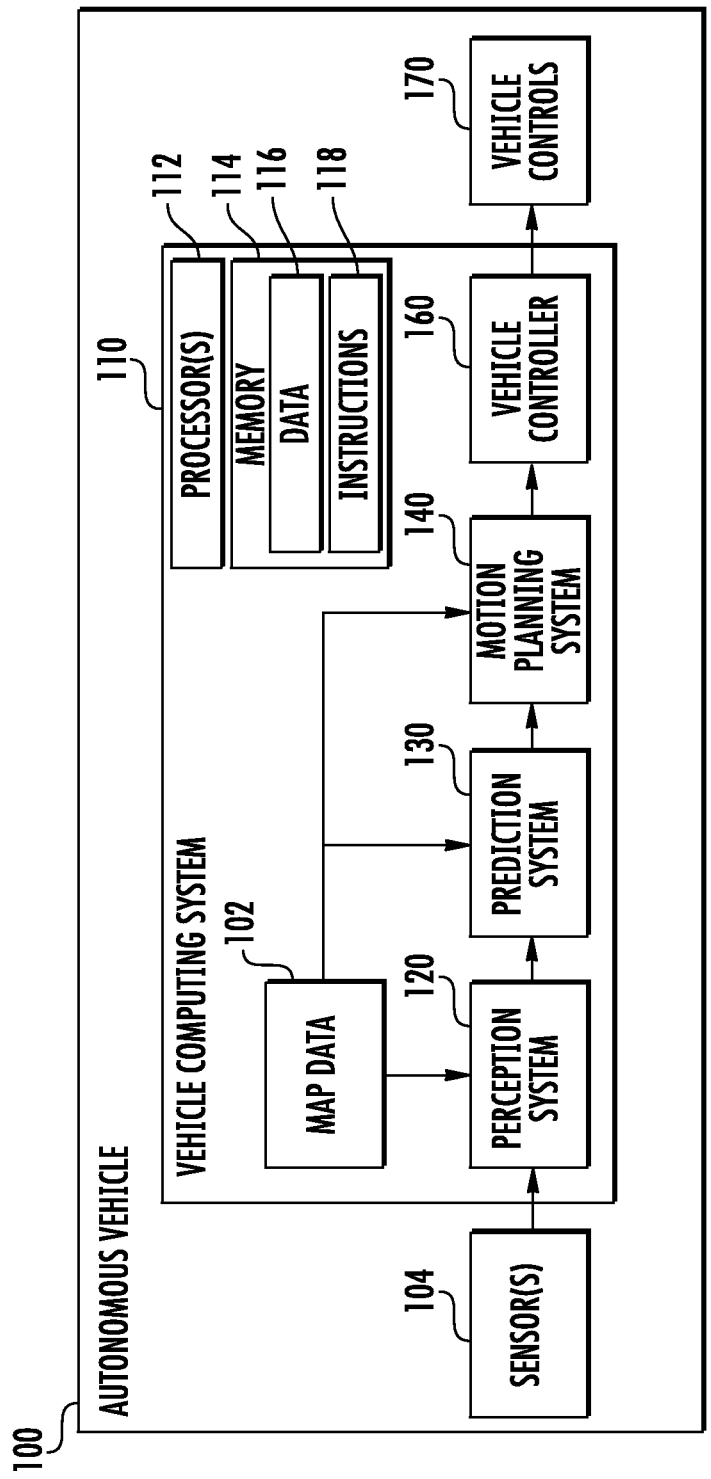
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to implementing control functionality (e.g., lateral control functionality) in control systems for autonomous vehicles. Autonomous vehicles can be equipped with autonomous systems that allow the autonomous vehicles to drive, navigate, operate, etc. with little or no interaction from a human operator. An autonomous system for an autonomous vehicle can include a data acquisition system, a positioning system, an autonomy computing system, and a vehicle control system. The data acquisition system can include one or more sensors configured to acquire sensor data associated with one or more objects that are proximate the vehicle. The positioning system can determine a current position and orientation (e.g., pose) of the vehicle. The autonomy computing system can include a perception system, a prediction system, and a motion planning system that can process data from the data acquisition system and other systems of the vehicle to perceive the surrounding environment of the vehicle and determine a motion plan for controlling the autonomous vehicle through the environment. The motion plan can provide a desired trajectory for the autonomous vehicle. The autonomy computing system can cooperate with the vehicle control system to control one or more vehicle components to operate the vehicle according to the determined motion plan.

In some implementations, the motion plan can be updated at time intervals as the vehicle autonomously travels through the environment. For instance, an updated motion plan can be determined at regular update intervals according to a refresh rate. As one example, an updated motion plan can be determined every 100 ms.

The vehicle control system can control the vehicle according to the motion plan by executing a control routine. The control routine can compare data indicative of a current vehicle state (e.g., position and/or heading (orientation) of the autonomous vehicle) to a desired vehicle state as indicated by a vehicle trajectory in a motion plan and execute a control action (e.g., generate a steering angle command) to control the vehicle to move in accordance with the motion plan. The control routine can be executed at discrete time intervals during control cycles according to a control rate. As one example, the control rate can be associated with executing the control routine every 10 ms.

Lateral control of an autonomous vehicle can control the direction of movement of the vehicle while in operation along a vehicle trajectory determined by a motion plan. Lateral control can be implemented using a vehicle control system by determining, for instance, steering angle commands. These commands can be provided to various control actuators or vehicle controls (e.g., a steering wheel, a pinion assembly, etc.) to control he direction of movement and thus the development of the position and heading of the vehicle with respect to the desired trajectory of position and heading.

According to example aspects of the present disclosure, a vehicle control system can implement a low level lateral control loop as part of a control routine. For example, an autonomous vehicle can be controlled to be kept close to a trajectory specified by a motion plan by comparing data indicative of a current state of the autonomous vehicle with a desired state of the autonomous vehicle as determined from the motion plan and controlling the autonomous vehicle (e.g., via steering angle commands and/or pinion commands) to move the autonomous vehicle towards the desired trajectory. This control loop or control routine can be executed once every control cycle (e.g., once every 10 ms).

In some cases, because the motion plan is updated at a slower rate, data indicative of a desired state (e.g., vehicle position and heading) of the vehicle can be obtained at a rate slower than the control rate associated with the low level control loop. For instance, a motion plan may be obtained from a motion planner at a rate slower than the control rate associated with the low level lateral control loop. According to example aspects of the present disclosure, data indicative of a desired state of the vehicle can be obtained at a faster rate by upsampling the data from the motion plan. For instance, the motion plan can be upsampled such that data indicative of vehicle position and/or heading can be determined from the motion plan for each control cycle.

In some embodiments, a fault condition can be detected. A fault condition can occur, for instance, when the vehicle control system stops receiving motions plans from the motion planning system. In these circumstances, the lateral control loop can implement the control action based on a safe stop trajectory. For instance, the desired vehicle state can be determined based on the safe stop trajectory. A safe stop trajectory can include a braking action. In some implementations, other vehicle maneuvers may be included as part of the safe stop trajectory. In some embodiments, the vehicle control system can execute a control routine associated with the safe stop trajectory at a control rate that is faster than the refresh rate for updating motion plans from the motion planner.

Example aspects of the present disclosure can provide a number of technical effects and benefits. For instance, the lateral control loop can be executed at a higher rate relative to a refresh rate for obtaining motion plans from a motion planning system. Providing a low level lateral control loop running at an increased rate as part of a control routine for a vehicle control system can advantageously provide autonomous vehicles with an ability to reduce potential cross-track error and smoothness of the ride. Cross-track error for an autonomous vehicle refers to the distance between the desired position according to the desired trajectory and the actual position in lateral direction. Those skilled in the art, using the disclosure provided herein, will understand the importance of the increased control rate used to control dynamic systems.

Example aspects of the present disclosure can also provide an improvement by providing tighter lateral control of the vehicle to a desired trajectory specified by a motion plan. This can allow for the determination of new motion plans in a motion planning system for the autonomous vehicle based at least in part on vehicle state specified in a previous motion plan (as opposed to actual pose estimates of vehicle position and/or heading). For instance, the motion planner can be configured to generate a new motion plan based at least in part on data indicative of vehicle state determined based on a previous motion plan for the autonomous vehicle, such as the immediately preceding motion plan before updating to the current motion plan. For instance, a previous motion plan can be analyzed to determine where the previous motion plan says the autonomous vehicle would be positioned and/or oriented if the vehicle followed the previous motion plan. Based on this information, the motion planner can generate the new motion plan.

Example aspects of the present disclosure can also provide an improvement in autonomous vehicle computing technology. For instance, reliance on previously obtained motion plans as an input for generation of a new motion plan can reduce processing and storage resources required for obtaining data associated with other control inputs (e.g., pose estimates) for the motion planning system. These processing and storage resources can be reserved for more core functions of the autonomous vehicle.

As used herein, the singular forms "a," "an," and "the" include plural unless the context clearly dictates otherwise. The use of the term "about" in conjunction with a numerical value refers to within 20% of the stated amount. The terms "first", "second", and "third" may be used interchangeably to distinguish one component from another and are not intended to signify location, order, or importance of the individual components. "Obtaining" data can include receiving, determining, calculating, accessing, reading or otherwise obtaining data.

FIG. 1 depicts a block diagram of an example autonomous vehicle 100 according to example embodiments of the present disclosure. The autonomous vehicle 100 is capable of sensing its environment and navigating without human input. The autonomous vehicle 100 can be a ground-based autonomous vehicle (e.g., car, truck, bus, etc.) or other types of vehicle (e.g., watercraft).

The autonomous vehicle 100 includes one or more sensors 104, a vehicle computing system 110, and one or more vehicle controls 170. The vehicle computing system 110 can assist in controlling the autonomous vehicle 100. In particular, the vehicle computing system 110 can receive sensor data from the one or more sensors 104, comprehend the surrounding environment by performing various processing techniques on data collected by the sensors 104, and generate an appropriate motion plan through such surrounding environment. The vehicle computing system 110 can control the one or more vehicle controls 170 (e.g., control actuators) to operate the autonomous vehicle 100 according to the motion plan.

The vehicle computing system 110 includes one or more processors 112 and one or more memory devices 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory device(s) 114 can include one or more non-transitory computer-readable storage mediums, such as RAM, ROM, EEPROM, EPROM, flash memory devices, magnetic disks, etc., and combinations thereof. The memory device(s) 114 can store data 116 and instructions 118 which are executed by the processor 112 to cause vehicle computing system 110 to perform operations, such as any of the operations described herein.

As illustrated in FIG. 1, the vehicle computing system 110 can include a perception system 120, a prediction system 130, and a motion planning system 140 that cooperate to perceive the surrounding environment of the autonomous vehicle 100 and determine a motion plan for controlling the motion of the autonomous vehicle 100 accordingly.

Each of the perception system 120, the prediction system 130, the motion planning system 140, and the vehicle controller 160 can include computer logic utilized to provide desired functionality. In some implementations, each of the perception system 120, the prediction system 130, the motion planning system 140, and the vehicle controller 160 can be implemented in hardware, firmware, and/or software controlling a general purpose processor. For example, in some implementations, each of the perception system 120, the prediction system 130, the motion planning system 140, and the vehicle controller 160 includes program files stored on a storage device, loaded into a memory and executed by one or more processors. In other implementations, each of the perception system 120, the prediction system 130, the motion planning system 140, and the vehicle controller 160 includes one or more sets of computer-executable instructions that are stored in a tangible computer-readable storage medium such as RAM hard disk or optical or magnetic media.

In some implementations, the perception system 120 can receive sensor data from the one or more sensors 104 that are coupled to or otherwise included within the autonomous vehicle 100. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects and/or relative/absolute speed of objects within the surrounding environment of the autonomous vehicle 100.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back and by measuring the phase-shift of the light returning from the object with respect to the phase of the light-wave leaving the sensor, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 104 can include a positioning system. The positioning system can determine a current position of the vehicle 100. The positioning system can be any device or circuitry for analyzing the position of the vehicle 100. For example, the positioning system can determine position by using one or more of inertial sensors, a satellite positioning system, based on IP address, by using triangulation and/or proximity to network access points or other network components and/or other suitable techniques. The position of the vehicle 100 can be used by various systems of the vehicle computing system 110.

Thus, the one or more sensors 104 can be used to collect sensor data that includes information that describes the location (e.g., in three-dimensional space relative to the autonomous vehicle 100) of points that correspond to objects within the surrounding environment of the autonomous vehicle 100.

In addition to the sensor data, the perception system 120 can retrieve or otherwise obtain map data 102 that provides detailed information about the surrounding environment of the autonomous vehicle 100. The map data 102 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the computing system 110 in comprehending and perceiving its surrounding environment and its relationship thereto.

The perception system 120 can identify one or more objects that are proximate to the autonomous vehicle 100 based on sensor data received from the one or more sensors 104 and/or the map data 102. In particular, in some implementations, the perception system 120 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 120 can determine state data for each object over a number of iterations. In particular, the perception system 120 can update the state data for each object at each iteration. Thus, the perception system 120 can detect and track objects (e.g., vehicles) that are proximate to the autonomous vehicle 100 over time.

The prediction system 130 can receive the state data from the perception system 120 and predict one or more future locations for each object based on such state data. For example, the prediction system 130 can predict where each object will be located within the next 5 seconds, 10 seconds, 20 seconds, etc. As one example, an object can be predicted to adhere to its current state according to its current speed. As another example, other, more sophisticated prediction techniques or modeling can be used.

The motion planning system 140 can determine a motion plan for the autonomous vehicle 100 based at least in part on the predicted one or more future locations for the object provided by the perception system 120 and/or map data (e.g., location of lanes and lane geometry). Stated differently, given information about the current locations of objects and/or predicted future locations of proximate objects, the motion planning system 140 can determine a motion plan for the autonomous vehicle 100 that best navigates the autonomous vehicle 100 relative to the objects at such locations.

In some embodiments, the motion planning system 140 can evaluate one or more cost functions for each of one or more candidate motion plans for the autonomous vehicle 100. For example, the cost function(s) can describe a cost of adhering to a particular candidate motion plan. The motion planning system 140 can decide to promote the candidate motion plan with most desirable cost as the new motion plan used by the system. Those skilled in the art, using the disclosures provided herein, will understand that the decision to promote a particular candidate motion plan can be based on picking the candidate motion plan with most desirable cost from a plurality of motion plans, or it can be based on promoting a candidate motion plan which meets certain criteria related to the cost values obtained when evaluating the cost function(s) for the candidate motion plan In some embodiments, to evaluate the one or more cost functions, the motion planning system 140 can determine a plurality of features that are within a feature space. For example, the status of each feature can be derived from the state of the vehicle and/or the respective states of other objects or aspects of the surrounding environment. According to one example notation, the plurality of features are within a feature space as follows: $F_x \in F$.

The motion planning system 140 can determine the plurality of features for each vehicle state included in the current candidate motion plan. In particular, according to one example notation, a candidate motion plan P can be expressed as a series of vehicle states, as follows: $P=\{x_0, \ldots, x_n\}$. The motion planning system 140 can determine the plurality of features for each vehicle state included in the candidate motion plan.

The motion planning system 140 can evaluate one or more cost functions based on the determined features. For example, in some implementations, the one or more cost functions can include a respective linear cost for each feature at each state. According to one example notation, the linear cost for the features at each state can be expressed as follows: $C(F_x)=w^T F_x$, where $w^T$ are a set of cost function coefficients. Although in the example a linear cost function with coefficients $w^T$ is used, those skilled in the art will understand, using the disclosures provided herein, that for the general case, when generating a motion plan for an autonomous vehicle which has to balance competing concerns, the cost function(s) applied to the features can be non-linear and also include thresholds or other configurable parameters.

Thus, according to one example notation, and in some example implementations, the total cost of a candidate motion plan can be expressed as follows:

$$C(P) = \sum_{x \in P} C(F_x) = \sum_{x \in P} w^T F_x$$

The motion planning system 140 can iteratively optimize the one or more cost functions to minimize a total cost associated with the candidate motion plan. For example, the motion planning system 140 can include an optimization planner that iteratively optimizes the one or more cost functions.

Following optimization, the motion planning system 140 can provide the optimal motion plan to a vehicle controller 160 that controls one or more vehicle controls 170 (e.g., actuators or other devices that control gas flow, steering, braking, etc.) to execute the optimal motion plan.

Figure 2:
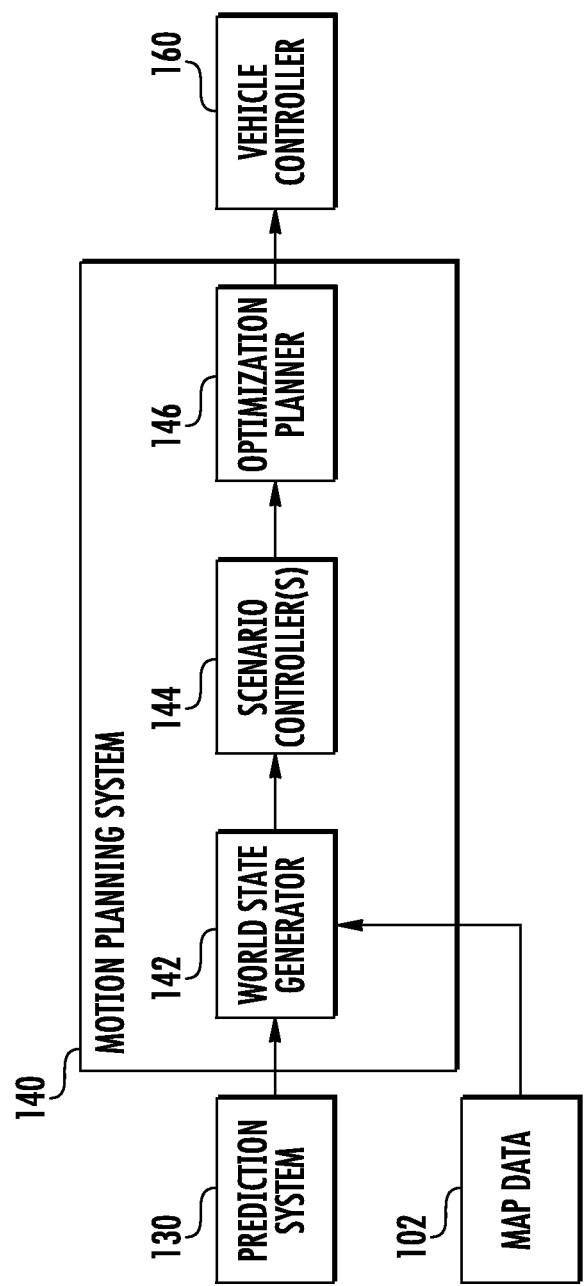
FIG. 2 depicts an example motion planning system according to example embodiments of the present disclosure.

FIG. 2 depicts a block diagram of an example motion planning system 140 according to example embodiments of the present disclosure. The example motion planning system 140 includes a world state generator 142, one or more scenario controllers 144, and an optimization planner 146.

The world state generator 142 can receive information from the prediction system 130, the map data 126, and/or other information such as vehicle pose, a current route, or other information. The world state generator 142 can synthesize all received information to produce a world state that describes the state of all objects in and other aspects of the surrounding environment of the autonomous vehicle at each time step.

The scenario controller(s) 144 can detect certain scenarios (e.g., a changing lanes scenario versus a queueing scenario) and guide the behavior of the autonomous vehicle according to the selected scenario. Thus, the scenario controller(s) can make discrete-type decisions (e.g., should the autonomous vehicle turn left, turn right, change lanes, etc.) and can control motion of the vehicle based on such decisions. In some implementations, each of the scenario controller(s) 144 can be a classifier (e.g., a machine-learned classifier) designed to classify the current state of the world as either included or excluded from one or more corresponding scenarios. In some implementations, the scenario controller(s) 144 can operate at each time step.

As examples, the scenario controllers 144 can include one or more of: a pass, ignore, queue controller that decides, for each object in the world, whether the autonomous vehicle should pass, ignore, or queue such object; a yield controller that decides, for each adjacent vehicle in the world, whether the autonomous vehicle should yield to such vehicle; a lane change controller that identifies whether and when to change lanes; and/or a speed regressor that determines an appropriate driving speed for each time step. These scenario controllers 144 are provided as examples only. Alternative and/or additional scenario controllers 144 can be used. In some implementations of the present disclosure, the motion planning system 140 does not include or implement the scenario controllers 144.

The motion planning system 140 can include an optimization planner 146 that searches (e.g., iteratively searches) over a motion planning space (e.g., an available control space) to identify a motion plan that optimizes (e.g., locally optimizes) a total cost associated with the motion plan. For example, the optimization planner can iteratively evaluate and modify a candidate motion plan until the total cost is optimized. The motion planning system 140 can output the determined motion plan to the vehicle controller 160 for use in controlling the vehicle to travel along a desired trajectory according to the motion plan.

The motion planning system 140 can provide a new motion plan (e.g., an updated motion plan) at time intervals as the vehicle autonomously travels through the environment. For instance, an updated motion plan can be determined at regular update intervals according to a refresh rate. As one example, an updated motion plan can be determined at a refresh rate of about 100 ms.

The vehicle controller 160 can receive the motion plan from the motion planning system 140 and determine control commands for vehicle controls (e.g., actuators, other devices that control gas flow, fuel injection, steering rack position, brake pressure, etc.) to control the autonomous vehicle to travel according to the motion plan. For instance, the motion plan can specify a desired trajectory for the autonomous vehicle. The vehicle controller 160 can determine control commands for vehicle controls to control the autonomous vehicle to travel according to the desired trajectory.

In some embodiments, the vehicle controller 160 can execute a control routine once every control cycle to control the autonomous vehicle to travel according to the motion plan. For instance, during the control routine, the vehicle controller 160 can receive feedback indicative of an actual state (e.g., position and heading) of the autonomous vehicle. The vehicle controller 160 can determine a desired state of the autonomous vehicle based on a motion plan for the vehicle. The vehicle controller 160 can generate control commands for vehicle controls based on a difference between the actual state of the vehicle and the desired state.

According to particular embodiments of the present disclosure, the vehicle controller 160 can execute a control routine for lateral control of the autonomous vehicle. Lateral control refers to controlling the rate of turning of the autonomous vehicle in a left direction or a right direction according to a trajectory of the vehicle provided by the motion plan.

The vehicle controller 160 can execute the control routine once every control cycle. The control cycles can be performed at intervals according to a control rate. In some embodiments, the control rate can be different than the refresh rate for obtaining updated motion plans and/or pose estimates indicative of current state of the autonomous vehicle from the motion planning system. The control rate can be, for instance, about 10 ms.

Figure 3:
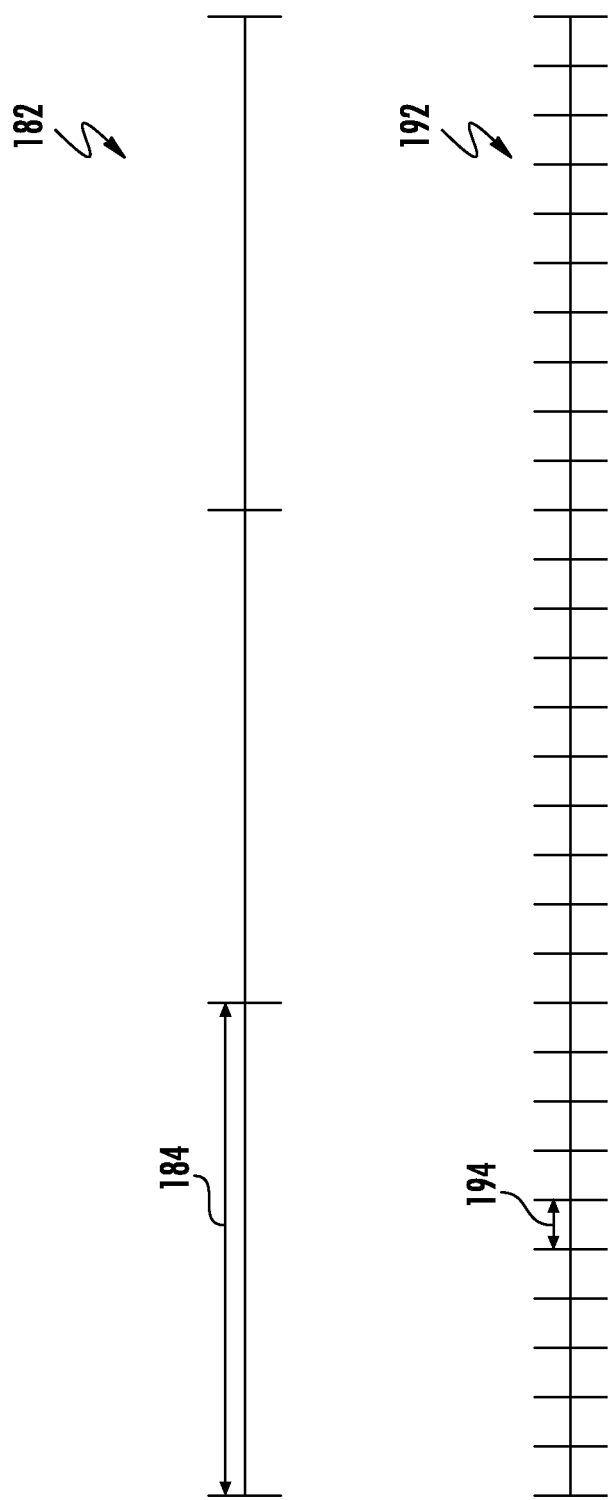
FIG. 3 depicts example refresh cycles for obtaining a motion plan and control cycles for executing a control routine according to example embodiments of the present disclosure.

FIG. 3 depicts a representation of example refresh cycles 182 for obtaining updated motion plans from the motion planning system and control cycles 192 for executing control routines by the vehicle controller. As shown, a refresh cycle 184 can be implemented at a much slower rate when compared to a control cycle 194.

Figure 4:
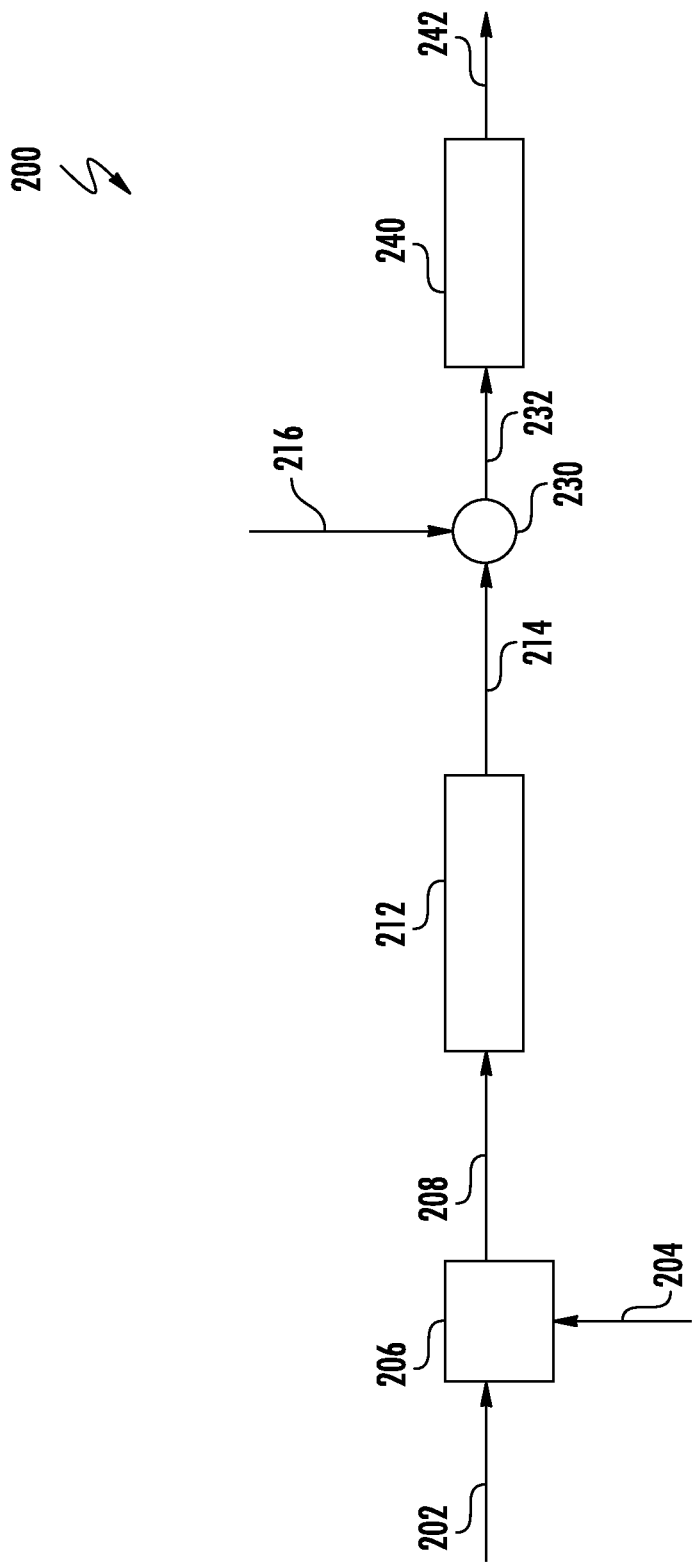
FIG. 4 depicts an example control diagram according to example embodiments of the present disclosure.

FIG. 4 depicts a control diagram of a control routine 200 implemented by a vehicle controller according to example embodiments of the present disclosure. The control routine 200 can be implemented, for instance, as at least a part of logic (e.g., instructions) executed by one or more processors. The control routine 200 can provide for a low level lateral control loop for the vehicle controller 160 to accommodate differences in the refresh rate associated with the motion planning system 140 and the control rate executed by the vehicle controller 160.

The control routine 200 can include, for instance, obtaining a signal 202 indicative of a motion plan for the autonomous vehicle. The motion plan can be the most recent motion plan obtained by the vehicle controller 160 from the motion planning system 140. The motion plan can specify a desired trajectory for the autonomous vehicle. In some embodiments, the motion plan can be determined based on a vehicle state as determined by a previous motion plan, such as the immediately preceding motion plan for the autonomous vehicle.

In some embodiments, the control routine 200 can also obtain a signal 204 indicative of a safe stop trajectory. The safe stop trajectory can specify a desired trajectory of the autonomous vehicle during a fault condition, such as a failure of a motion planning system to provide an updated motion plan or other fault condition. For instance, the safe stop trajectory can specify a breaking action for the autonomous vehicle and can include a lateral component.

The control routine 200 can execute decision logic 206 to determine whether to control the autonomous vehicle based on the signal 202 indicative of the motion plan or the signal 204 indicative of the safe stop trajectory. The decision logic 206 can select one of signal 202 or signal 204 to output as signal 208 to upsampling logic 212 for use in controlling the autonomous vehicle. In some embodiments, the decision logic 206 can select signal 204 to output as signal 208 during a fault mode. A fault mode can occur during a failure to obtain a motion plan from the planning system.

The control routine 200 can execute upsampling logic 212 to upsample the signal 208. Upsampling can including processing the trajectory specified by the motion plan or safe stop trajectory at a sampling rate that is greater than the refresh rate to determine a desired state (e.g., position and/or heading) of the autonomous vehicle for each of a plurality of upsampling intervals.

Figure 5:
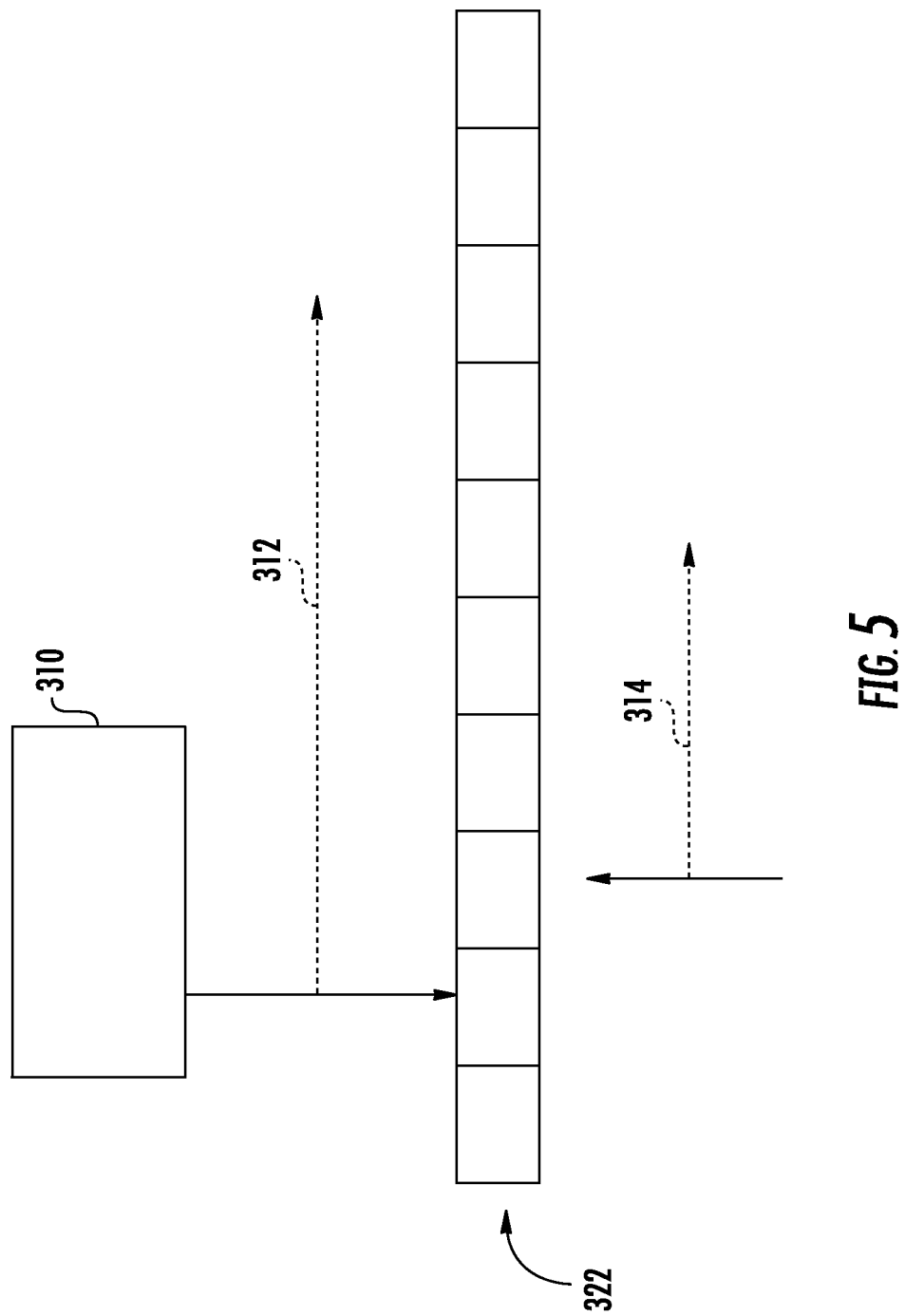
FIG. 5 depicts a representation of example upsampling of data indicative of a previous motion plan according to example embodiments of the present disclosure.

FIG. 5 depicts a representation of example upsampling of data indicative of a motion plan 310 according to example embodiments of the present disclosure. More particularly, a desired vehicle state determined from the motion plan 310 can be written to a buffer 322 (e.g., a circular buffer) at an upsampling speed represented by arrow 312. Data indicative of the desired vehicle state determined from the motion plan can be read from the buffer 322 at a rate associated with execution of a control routine by the vehicle controller (e.g., the control rate). In some embodiments, the upsampling rate 312 can be greater than the rate at which the desired vehicle state is read from the buffer 322 so that a desired vehicle state is always available for use by the vehicle controller 160 in controlling the autonomous vehicle.

Referring to FIG. 4, a signal 214 indicative of a desired vehicle state obtained from upsampling logic 212 can be provided to error determination logic 230. Error determination logic can also obtain a signal 216 indicative of a current vehicle state for the autonomous vehicle. The signal 216 can include a pose estimate for the autonomous vehicle. In some embodiments, the signal 216 indicative of the pose estimate can be obtained directly from a data acquisition system (e.g., positioning system) associated with the autonomous vehicle.

Error determination logic 230 can determine a difference between the signal 214 and the signal 220 and output a control signal 232 to conversion logic 240. Conversion logic 240 can be a regulator that determines a control command 242 for controlling one or more vehicle controls based on the error signal 232. The control command 242 can be, for instance, a steering angle command for the autonomous vehicle.

Figure 6:
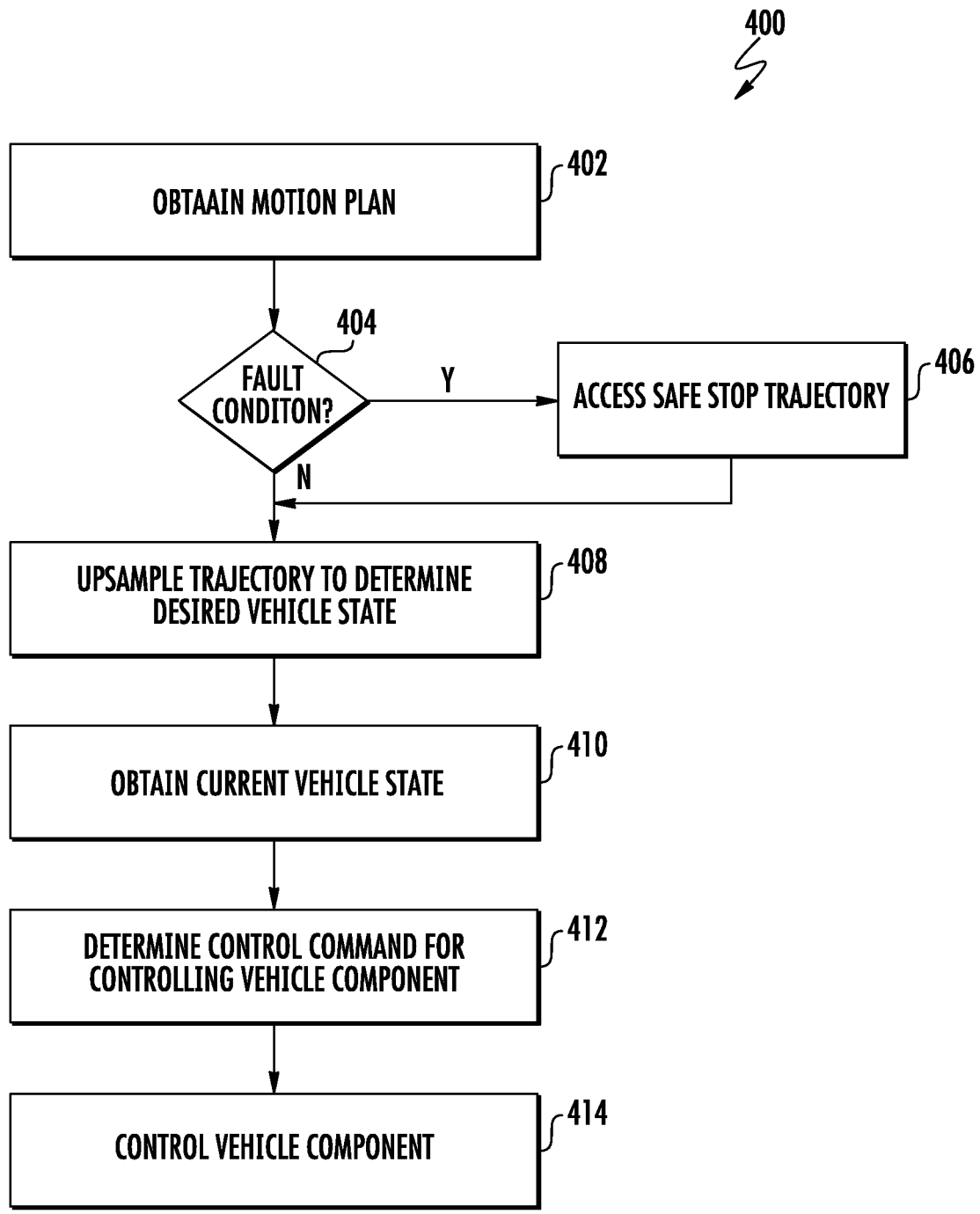
FIG. 6 depicts a flow diagram of an example method according to example embodiments of the present disclosure.

FIG. 6 depicts a flow diagram of an example method (400) for controlling an autonomous vehicle according to example embodiments of the present disclosure. The method (400) can be implemented by a vehicle controller, such as the vehicle controller 160 of FIG. 1. FIG. 6 depicts steps performed in a particular order for purposes of illustration and discussion. Those of ordinary skill in the art, using the disclosures provided herein, will understand that various steps of any of the methods or processes disclosed herein can be omitted, rearranged, performed simultaneously, expanded and/or modified in various ways without deviating from the scope of the present disclosure.

At (402), the method can include obtaining a motion plan for each of a plurality of update intervals. The motion plan can provide a desired trajectory of the autonomous vehicle. The motion plan can be obtained, for instance, from a motion planning system, such as motion planning system 140 discussed with reference to FIGS. 1 and 2.

At (404) of FIG. 6, the method includes determining whether a fault condition has occurred. A fault condition can be any condition which may cause the autonomous vehicle to no longer operate in a fully autonomous mode. In some embodiments, a fault condition can be associated with the vehicle control system. For example a fault condition can be identified as the vehicle controller 160 not obtaining a motion plan for one or multiple update intervals, or as the vehicle controller identifying conditions which indicate that the received motion plan is not a valid motion plan.

When a fault condition is present, the method can include accessing a safe stop trajectory (406). The safe stop trajectory can specify a desired trajectory of the autonomous vehicle during a fault condition, such as a failure of a motion planning system to provide an updated motion plan or other fault condition. For instance, the safe stop trajectory can specify a breaking action for the autonomous vehicle and can include a lateral component. Otherwise the method can proceed to (408) based at least in part on the motion plan.

At (408), the method can include upsampling the trajectory specified by the motion plan (or safe stop trajectory) to determine a desired vehicle state (e.g., desired vehicle position and heading). Upsampling can refer to sampling a trajectory at a sampling rate that is greater than the refresh rate to determine a desired vehicle state for each of a plurality of upsampling intervals. Upsampling can also refer to determining desired state information by combining a multitude of scalars representing a desired state in a motion plan to a new scalar representing additional state information using a model.

At (410), the method can include obtaining data indicative of a current vehicle state. The data indicative of a current vehicle state can be indicative of an actual position and/or heading of a vehicle. The data can be obtained, for instance, using one or more sensors associated with a data acquisition system for the autonomous vehicle.

At (412), the method can include determining a control command for controlling a vehicle component based at least in part on the first signal and the second signal. For instance, determining the control command can include determining a difference between the desired vehicle state and the current vehicle state. The control command can be determined to move the autonomous vehicle from the current vehicle state to the desired vehicle state based on the difference. The control command can be, for instance, a steering angle command.

At (414), the method can include controlling a vehicle component based on the control command. For instance, the control command can be communicated to a steering assembly to control movement of the autonomous vehicle in accordance with the control command.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A control method for an autonomous vehicle, the control method comprising:

obtaining, by a computing system comprising one or more computing devices, data indicative of a motion plan for the autonomous vehicle, wherein motion plans for the autonomous vehicle are obtained during each update interval of a plurality of update intervals, the update intervals being associated with a refresh rate, further wherein the control method is executed during each control cycle of a plurality of control cycles, the plurality of control cycles being executed at a control rate, the refresh rate being different from the control rate;

upsampling, by the computing system, the data indicative of the motion plan to determine a desired vehicle state for the autonomous vehicle, wherein upsampling includes determining the desired vehicle state for a time after a first update interval but before a second update interval based on previously obtained data indicative of the motion plan;

obtaining, by the computing system, data indicative of a current vehicle state for the autonomous vehicle;

determining, by the computing system, a control command for the autonomous vehicle based at least in part on the desired vehicle state and the current vehicle state; and controlling, by the computing system, a vehicle component based at least in part on the control command.

2. The control method of claim 1, wherein determining, by the computing system, a control command for controlling a vehicle component comprises determining, by the computing system, a steering angle command for the autonomous vehicle.

3. The control method of claim 1, wherein a control command for the autonomous vehicle based at least in part on the desired vehicle state and the current vehicle state comprises:

determining, by the computing system, a difference between the desired state and the current state; and determining, by the computing system, the control command to move the autonomous vehicle based at least in part on the different between the desired state and the current state.

4. The control method of claim 1, wherein the control rate is faster than the refresh rate.

5. The control method of claim 1, wherein the method comprises identifying, by the computing system, a fault condition for the autonomous vehicle, wherein the fault condition is associated with a failure to obtain a motion plan.

6. The control method of claim 5, wherein during the fault condition, the control method comprises:
    accessing, by the computing system, a safe stop trajectory; and
    determining, by the computing system, a desired trajectory based at least in part on the safe stop trajectory.

7. The control method of claim 1, wherein the data indicative of a current vehicle state for the autonomous vehicle comprises one or more pose estimates for the autonomous vehicle.

8. The control method of claim 1, wherein the method comprises determining, by the one or more computing devices, the data indicative of the motion plan based at least in part on a vehicle state determined from a previous motion plan.

9. The control method of claim 8, wherein the previous motion plan is an immediately preceding motion plan for the autonomous vehicle.

10. A vehicle control system for controlling one or more vehicle components on an autonomous vehicle to implement autonomous travel, the vehicle control system comprising:
    one or more processors; and
    one or more memory devices, the one or more memory devices storing computer readable instructions that when executed by the one or more processors cause the one or more processors to perform operations, the operations comprising:
    obtaining a motion plan during each of a plurality of update intervals, the motion plan for each update interval providing a desired trajectory of the autonomous vehicle, wherein motion plans for the autonomous vehicle are obtained during each update interval of a plurality of update intervals, the update intervals being associated with a refresh rate, further wherein a control routine is executed during each control cycle of a plurality of control cycles, the plurality of control cycles being executed at a control rate, the refresh rate being different from the control rate;
    executing the control routine during each control cycle of a plurality of control cycles to control the autonomous vehicle based at least in part on the motion plan;
    wherein the control routine for each control cycle comprises:
        upsampling data indicative of the motion plan to determine a desired vehicle state for the autonomous vehicle, wherein upsampling includes determining the desired vehicle state for a time after a first update interval but before a second update interval based on data indicative of the motion plan;
        obtaining data indicative of a current vehicle state for the autonomous vehicle;
        determining a control command for the autonomous vehicle based at least in part on the desired vehicle state and the current vehicle state; and
        controlling the vehicle component based at least in part on the control command.

11. The vehicle control system of claim 10, wherein the control command comprises a steering angle command for the autonomous vehicle.

12. The vehicle control system of claim 10, wherein the operation of determining a control command for controlling a vehicle component based at least in part on the desired vehicle state and the current vehicle state comprises:
    determining a difference between the desired state and the current state; and
    determining the control command to move the autonomous vehicle based at least in part on the different between the desired state and the current state.

13. The vehicle control system of claim 10, wherein the operations comprise identifying a fault condition for the autonomous vehicle, wherein the fault condition is associated with a failure to obtain a motion plan.

14. The vehicle control system of claim 13, wherein during the fault condition, the control routine comprises:
    accessing, by the one or more processors, a safe stop trajectory; and
    determining, by the one or more processors, the desired trajectory based at least in part on the safe stop trajectory.

15. The vehicle control system of claim 10, wherein the update intervals are associated with a refresh rate, wherein the plurality of control cycles are executed at a control rate, the control rate being different than the refresh rate.

16. The vehicle control system of claim 10, wherein the operation of obtaining a motion plan during each of a plurality of update intervals comprises obtaining a motion plan determined based at least in part on a previous motion plan for the autonomous vehicle.

17. An autonomous vehicle, comprising:
    a data acquisition system configured to acquire sensor data associated with one or more objects proximate the vehicle;
    a motion planning system configured to generate one or more motion plans for the autonomous vehicle, wherein motion plans for the autonomous vehicle are generated during each update interval of a plurality of update intervals, the update intervals being associated with a refresh rate, further wherein a control method is executed during each control cycle of a plurality of control cycles, the plurality of control cycles being executed at a control rate, the refresh rate being different from the control rate; and
    a vehicle control system, the vehicle control system comprising:
        one or more processors; and
        one or more memory devices, the one or more memory devices storing computer readable instructions that when executed by the one or more processors cause the one or more processors to perform operations, the operations comprising:
    wherein a control routine for each control cycle comprises:
        upsampling the data indicative of the motion plan to determine a desired vehicle state for the autonomous vehicle, wherein upsampling includes determining the desired vehicle state for a time after a first update interval but before a second update interval based on previously obtained data indicative of the motion plan;
        obtaining data indicative of a current vehicle state for the autonomous vehicle;

determining a control command for the autonomous vehicle based at least in part on the desired vehicle state and the current vehicle state; and controlling a vehicle component based at least in part on the control command.

18. The autonomous vehicle of claim 17, wherein the operations comprise identifying a fault condition for the autonomous vehicle, wherein the fault condition is associated with a failure to obtain a motion plan.

19. The autonomous vehicle of claim 18, wherein during the fault condition, the control routine comprises:

accessing a safe stop trajectory; and determining the desired trajectory based at least in part on the safe stop trajectory.

* * * * *